3,349,076
MONOAZO DYES
Max A. Weaver and David J. Wallace, Kingsport, Tenn., assignors to Eastman Kodak Company, Rochester, N.Y., a corporation of New Jersey
No Drawing. Filed Sept. 3, 1964, Ser. No. 394,346
11 Claims. (Cl. 260—152)

ABSTRACT OF THE DISCLOSURE

Phenylazophenyl compounds useful as dyes for hydrophobic textile materials are characterized by the presence of a heterocyclic group attached to the coupler moiety of the compounds and having the formula

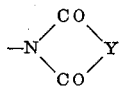

wherein Y represents —NHNH— or a chain of 2 to 3 atoms consisting of carbon and at least one oxygen, sulfur, or nitrogen atom.

---

This invention relates to azo compounds particularly useful as dyes for textile fibers, yarns and fabrics.

The azo compounds have the following general formula (I)

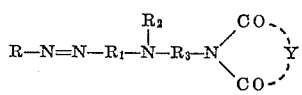

wherein R represents a benzene radical including phenyl and substituted phenyl such as alkylphenyl, e.g. tolyl; alkoxyphenyl, e.g. 2-methoxy and 2,5-dimethoxyphenyl; halophenyl, e.g. 3-chlorophenyl; carboalkoxyphenyl, e.g. carbomethoxy; alkoxyalkyl, e.g. methoxyethyl; alkylthiophenyl, e.g. methylthiophenyl; alkylsulfonylphenyl, e.g. methylsulfonylphenyl; acyloxyphenyl, e.g. acetoxyphenyl; acylamidophenyl, e.g. acetamidophenyl; cyanophenyl; nitrophenyl; alkylsulfonamidophenyl, e.g. methylsulfonamidophenyl; sulfonamidophenyl; benzenesulfonamidophenyl; benzamidophenyl, $R_1$ represent a phenylene radical including unsubstituted p-phenylene and substituted phenylene such as alkylphenylene, e.g. m-tolylene

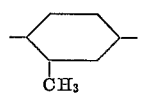

o-tolylene; alkoxylphenylene, e.g. 3-methoxyphenylene

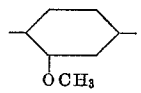

2,5 - dimethoxyphenylene; acylamidophenylene, e.g. 3-acetamidophenylene; halophenylene, e.g. 3-chlorophenylene, $R_2$ represents hydrogen or an alkyl radical including lower alkyl and substituted lower alkyl such as hydroxyalkyl, e.g. hydroxyethyl; alkoxyalkyl, e.g. methoxyethyl; cyanoalkyl, e.g. cyanoethyl; acyloxyalkyl, e.g. acetoxyethyl; carboalkoxyalkyl, e.g. carbethoxyethyl; halogenoalkyl, e.g. chloroethyl; alkylsulfonylalkyl, e.g. methyl sulfonylethyl; carboxamidoalkyl, e.g. carboxamidoethyl, etc. or $R_2$ represents a benzene radical such as unsubstituted phenyl and substituted phenyl such as the alkylphenyl, alkoxyphenyl and other substituted phenyl groups given above, $R_3$ represents a lower alkylene group and Y represents —NHNH— or a chain of 2 or 3 atoms consisting of carbon and at least one oxygen, sulfur or nitrogen atom, for example, as present in the radicals: 3,5-morpholinedione, 2,5-piperazinedione, 5,6-dihydrouracil and 2,4-thiazolidinedione of the azo compounds described below.

The Wallace et al. U.S. Patent 3,148,178 granted Sept. 8, 1964, claims azo compounds containing the dicarboximido radical

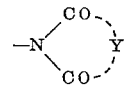

However, specific embodiments of that patent are limited to azo compounds wherein Y represents a chain containing only carbon atoms as in the succinimido radical. As described above, in the present azo compounds Y represents a chain of atoms containing at least one atom other than carbon including oxygen, nitrogen and sulfur. This distinctive structure imparts unexpected properties to the present azo compounds including improved fastness to light and sublimation especially when the azo compounds are used for dyeing textile materials. These substituents attached to the benzene, phenylene and alkyl radicals R, $R_1$ and $R_2$ are not critical and serve primarily as auxochromes to control the color of the azo compound.

Herein, "lower alkyl group," "lower alkylene group" and the like, means that the group contains a chain of from 1 to 4 carbon atoms, straight or branched chained.

The azo compounds of the invention are prepared by coupling well-known diazonium salts including diazotized aromatic amines $RNH_2$, with the N-dicarboximidoalkylaniline coupling components of the invention having the formula (II)

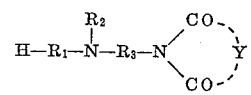

wherein R, $R_1$, $R_2$, $R_3$ and Y have the meaning given above.

The coupling components having the above Formula II are prepared by one of the two following methods:

(1)

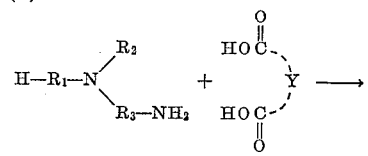

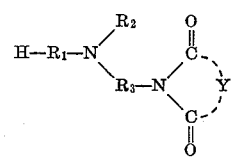

or anhydride (2)

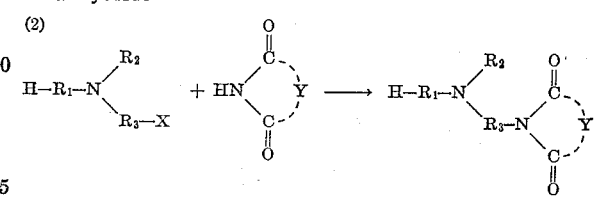

in which X is halogen.

The compounds wherein Y contains the —C—N— chain are illustrated by the uracil, dihydrouracil, hydantoin and piperazinedione substituted compounds of the examples. Where Y contains the —C—O— chain the morpholinedione substituted compounds of the examples are illustrative, and where Y contains the —C—S— chain the thiazolidinedione substituted compounds of the examples are illustrative.

The azo compounds can be used for dyeing textile materials including synthetic polymer fibers, yarns and fabrics giving a variety of fast shades including blue, yellow, red and brown when applied thereto by conventional dyeing methods. The azo compounds have moderate affinity for cellulose ester and polyamide fibers and possess the valuable property of staining wool less than do previous benzothiazole dyes. When the azo compounds are used for dyeing such hydrophobic materials, they should be free of water-solubilizing groups such as sulfo and carboxyl. In general the dyes have good fastness, for example, to light, washing, gas (atmospheric fumes) and sublimation.

The following examples will serve to illustrate the preparation of representative intermediates and azo compounds of our invention.

EXAMPLES OF N-DICARBOXIMIDO-ALKYLANILINE COUPLERS

*Preparation 3 - [2 - (N-ethyl-m-toluidino)ethyl]hydantoin.*—19.7 g. N-2-chloroethyl-N-ethyl-m-toluidine, 10.0 g. hydantoin, 13.8 g. potassium carbonate, and 150 ml. dry dimethylformamide were refluxed together for one hour. The reaction mixture was drowned into 500 ml. of water giving a white solid on standing. The product was recrystallized from ethanol to give 13.5 g. of material melting at 76–77° C., having the structure:

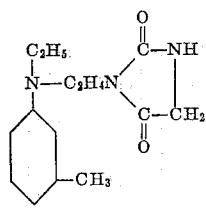

*Preparation of 3-[2-(N-ethyl-m-toluidino)ethyl-5,5-dimethylhydantoin.*—19.7 g. N - 2-chloroethyl-N-ethyl-m-toluidine, 12.8 g. 5,5-dimethylhydantoin, 13.8 g. potassium carbonate, and 150 ml. dry dimethyl formamide were refluxed together for one hour. Drowning into water, filtering, and recrystallizing from 75 ml. ethanol gave 15.2 g. white solid product with M.P. 81–82° C.

*Preparation of 3-[2-(N-ethyl - m - toluidino)ethyl]-1-methylhydantoin.*—19.7 g. N-2-chloroethyl-N-ethyl-m-toluidine, 11.4 g. 1-methylhydantoin, 13.8 g. potassium carbonate, and 100 ml. dry dimethylformamide were refluxed together for one hour. Drowning in water resulted in a white solid which was collected by filtration, washed with water, and recrystallized from 100 ml. ethanol to yield 18.5 g. product with M.P. 72–73° C.

*Preparation of 4-[2-(N-ethyl-m-toluidino)ethyl]-3,5-morpholinedione.*—89.0 g. N-2-aminoethyl-N-ethyl-m-toluidine, 67.0 g. diglycolic acid, and 0.1 g. sulfanilic acid were heated together at 150–155° C. for one hour. The reaction mixture was poured into 500 ml. ethanol and the product allowed to crystallize. After collection by filtration and recrystallization from 500 ml. ethanol there was obtained 70.5 g. of product of M.P. 82–83° C. This material has the following structure:

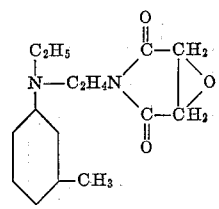

*Preparation of 1-[2-(N-ethyl-m-toluidino)ethyl]-2,5-piperazinedione.*—44.5 g. N-2-aminoethyl - N - ethyl-m-toluidine, 33.2 g. iminodiacetic acid, 0.1 g. sulfanilic acid were heated together at 180–190° C. for one hour. The reaction mixture was then poured into 300 ml. ethanol and the product allowed to crystallize. Collection by filtration gave 20.0 g. product when air dried. M.P. 191–194° C. One recrystallization from ethanol gave material melting at 197.5–198.5° C. The product had the following structure:

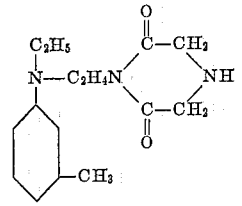

*Preparation of 3-[2-(N-ethyl-m-toluidino)ethyl]-5,6-dihydrouracil.*—N - 2 - chloroethyl-N-ethyl-m-toluidine, 11.4 g. 5,6-dihydrouracil, 13.8 g. potassium carbonate, and 100 ml. dry dimethylformamide were refluxed together for one hour. The reaction mixture was drowned into water, and the product collected by filtration, washed with water, and recrystallized from 50% aqueous ethanol. Yield—20.5 g., M.P. 108–110° C. The product has the following structure:

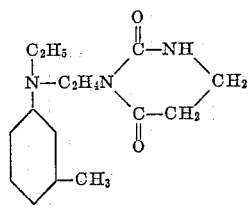

*Preparation of 3-[2-(N-ethyl-m-toluidino)ethyl]-2,4-thiazolidinedione.*—19.7 g. N-2-chloroethyl-N-ethyl-m-toluidine, 11.7 g. 2,4-thiazolidinedione, 13.8 g. potassium carbonate, and 100 ml. dry dimethylformamide were heated together at 130° C. for one hour. Drowning of the reaction mixture into water gave a yellow oil, which was washed by decantation and taken up in 100 ml. ethanol. The product crystallized when alcohol solution was chilled. There was obtained 10.0 g. of product after filtering and drying in air. M.P. 59–60° C.

All of the couplers used were prepared by one of the above methods.

EXAMPLES OF THE DYES

Example 1

1.27 g. p-chloroaniline was dissolved in 10 ml. water containing 3 cc. conc. HCl. Ice was added followed by a solution of 0.72 g. sodium nitrite in 2 ml. water. The solution was stirred 15 minutes, then poured into a solution of 2.61 g. 3-[2-N-ethyl-m-toluidino)ethyl]hydantoin in 25 cc. dilute HCl containing ice. The coupling solution was neutralized to Congo red paper with ammonium acetate, and allowed to couple cold for one hour, filtered, washed with water, and dried at room temperature. The product dyes cellulose acetate, polyester, and nylon fibers yellow shades of good fastness properties, and has the following structure:

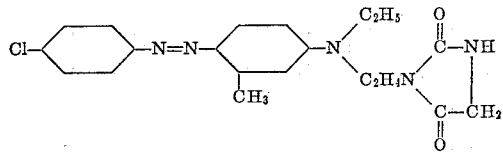

Example 2

6.21 g. 2,6-dichloro-4-nitroaniline was dissolved in 37.5 cc. conc. $H_2SO_4$ at 25° C. The solution was chilled and a solution of 2.2 g. $NaNO_2$ in 15 cc. conc. $H_2SO_4$ added below 5° C. The diazotization was stirred at 0–5° C. for two hours, then added to a chilled solution of 8.67 g. 3-[2 - (N-ethyl-m-toluidino)ethyl]-5,5-dimethylhydantoin in 200 ml. 15% aqueous sulfuric acid below 15° C.

The coupling was neutralized with solid ammonium acetate until solution turned Congo red paper brown. After coupling two hours, the mixture was drowned with water, filtered, washed with water, and dried. The product dyed polyester fibers a desirable shade of brown of excellent fastness properties.

*Example 3*

6.9 g. p-nitroaniline was dissolved in 5.4 cc. conc. $H_2SO_4$ and 12.6 cc. water. This solution was poured onto 50 g. ice and then a solution of 3.6 g. sodium nitrite in 8 cc. water was added all at once. The diazotization was stirred at 5° C. for one hour, resulting in almost complete solution. After filtration, the diazonium solution was added to a chilled solution of 13.9 g. of 3-[2-(ethyl-m-toluidino)ethyl]-2,4-thiazolidinedione in 250 ml. of 15% sulfuric acid. The coupling was neutralized with solid ammonium acetate to brown on Congo red paper. After coupling two hours, the mixture was drowned with water, filtered, washed with water, and air dried. The product dyes polyester and cellulose acetate fibers in orange shades of good fastness properties. The dye has the structure:

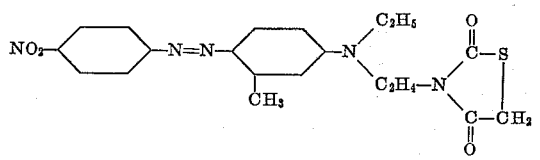

*Example 4*

A solution of 3.6 g. dry sodium nitrite in 25 cc. conc. sulfuric acid was cooled in an ice bath, and 50 cc. 1:5 acid (1 part propionic:5 parts acetic) was added below 15° C. This solution was stirred at 5° C. and 8.6 g. 2-chloro-4-nitroaniline was added, followed by 50 cc. 1:5 acid. The diazotization was stirred three hours at 0–5° C., then added to a chilled solution of 13.8 g. of 4-[2-(N-ethyl-m-toluidino)ethyl]-3,5-morpholine - dione dissolved in 250 cc. 1:5 acid. The coupling was kept cold and neutralized to Congo red paper with solid ammonium acetate. After coupling two hours, the mixture was drowned with water, filtered, washed with water, and air dried. The product dyes polyester fibers a deep shade of red with outstanding light and sublimation fastness, and has the following structure:

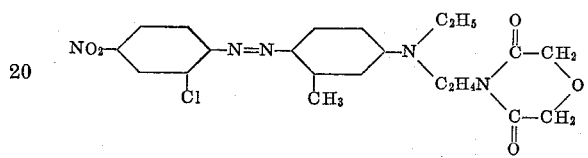

The azo compounds of the following table are made by methods (1) or (2) above, illustrated by Examples 1–4. Thus, the diazotized anilines are coupled with the dicarboximidoalkylaniline couplers of Formula II above as indicated in the table.

| Example No. | Aniline Diazotized | Dicarboximidoalkylaniline coupler | | | | Color Polyester Dyeing |
|---|---|---|---|---|---|---|
| | | Substituents on Radical $R_1$ | $R_2$ | $R_3$ | Y | |
| 5 | 2,6-di-Cl-4-$NO_2$ | 3-$CH_3$ | —$C_2H_5$ | —$CH_2CH_2$— | —$NHCH_2$— | Brown. |
| 6 | 2,6-di-Cl-4-$NO_2$ | 3-$CH_3$ | —$C_2H_5$ | —$CH_2CH_2$— | —NHCH— (cyclohexyl) | Do. |
| 7 | 2,6-di-Cl-4-$NO_2$ | 3-$CH_3$ | —$C_2H_5$ | —$CH_2CH_2$— | —$CH_2$—S— | Do. |
| 8 | 2,6-di-Cl-4-$NO_2$ | 3-$CH_3$ | —$C_2H_5$ | —$CH_2CH_2$— | —N($CH_3$)—$CH_2$— | Do. |
| 9 | 2,6-di-Cl-4-$NO_2$ | 3-$CH_3$ | —$C_2H_5$ | —$CH_2CH_2$— | —$CH_2SO_2CH_2$— | Do. |
| 10 | 2,6-di-Cl-4-$NO_2$ | 3-$CH_3$ | —$C_2H_5$ | —$CH_2CH_2$— | —$NHCH_2CH_2$— | Do. |
| 11 | 2,6-di-Cl-4-$NO_2$ | 3-$CH_3$ | —$C_2H_5$ | —$CH_2CH_2$— | —$CH_2OCH_2$— | Do. |
| 12 | 2,6-di-Cl-4-$NO_2$ | 3-$CH_3$ | —$C_2H_5$ | —$CH_2CH_2$— | —$CH_2SCH_2$— | Do. |
| 13 | 2,6-di-Cl-4-$NO_2$ | 3-$CH_3$ | —$C_2H_5$ | —$CH_2CH_2$— | —$CH_2NHCH_2$— | Do. |
| 14 | 2,6-di-Cl-4-$NO_2$ | 3-$CH_3$ | —$C_2H_5$ | —$CH_2CH_2$— | —$CH_2O$— | Do. |
| 15 | 2,6-di-Cl-4-$NO_2$ | None | —$C_2H_5$ | —$CH_2CH_2$— | —CH=CH—NH— | Orange. |
| 16 | 2,6-di-Cl-4-$NO_2$ | do | —$C_2H_5$ | —$CH_2CH_2$— | —NH—NH— | Do. |
| 17 | 2,6-di-Cl-4-$NO_2$ | do | —$C_2H_5$ | —$CH_2CH_2$— | —C($CH_3$)($CH_3$)—N—$CH_2OH$ | Do. |
| 18 | 2,6-di-Cl-4-$NO_2$ | do | —$C_2H_5$ | —$CH_2CH_2$— | —NH—(phenyl) | Do. |
| 19 | 2,6-di-Cl-4-$NO_2$ | do | —$C_2H_5$ | —$CH_2CH_2$— | —O—(phenyl) | Do. |
| 20 | 2,6-di-Cl-4-$NO_2$ | 3-$CH_3$ | —$C_2H_4CN$ | —$CH_2CH_2$— | —NH—CH($CH_3$)— | Do. |
| 21 | 2,6-di-Cl-4-$NO_2$ | 3-$CH_3$ | —$C_2H_4CONH_2$ | —$CH_2CH_2$— | —NH—CH($CH_2OH$)— | Do. |
| 22 | 2,6-di-Cl-4-$NO_2$ | 3-$CH_3$ | —$C_2H_4Cl$ | —$CH_2CH_2$— | —NH—CH—$C_4H_9$(n) | Do. |
| 23 | 2,6-di-Cl-4-$NO_2$ | 3-$CH_3$ | —$C_2H_4Cl$ | —$CH_2CH_2$— | —NH—CH—$CH_2COOH$ | Do. |

| Example No. | Aniline Diazotized | Dicarboximidoalkylaniline coupler | | | | Color Polyester Dyeing |
|---|---|---|---|---|---|---|
| | | Substituents on Radical $R_1$ | $R_2$ | $R_3$ | Y | |
| 24 | 2,6-di-Cl-4-$NO_2$ | 3-$CH_3$ | —$C_2H_4Cl$ | —$CH_2CH_2$— | ![pyrrolidine ring structure with N] | Do. |
| 25 | 2-Cl-4-$NO_2$ | 3-$CH_3$ | —$C_2H_5$ | —$CH_2CH_2$— | —$NHCH_2CH_2$— | Red. |
| 26 | 2-Cl-4-$NO_2$ | 3-$CH_3$ | —$C_2H_5$ | —$CH_2CH_2$— | —S—$CH_2$— | Red. |
| 27 | 2-Cl-4-$NO_2$ | 3-$CH_3$ | —$C_2H_5$ | —$CH_2CH_2$— | —$NHCH_2$— | Red. |
| 28 | 2-Cl-4-$NO_2$ | None | —$CH_3$ | —$CH_2CH_2$— | —$NHCH_2$— | Orange. |
| 29 | 2-Cl-4-$NO_2$ | 3-Cl | —$C_2H_5$ | —$CH_2CH_2$— | —$NHCH_2CH_2$— | Red. |
| 30 | 2-Cl-4-$NO_2$ | 3-$OCH_3$ | —$C_2H_5$ | —$CH_2CH_2$— | —$CH_2OCH_2$— | Red. |
| 31 | 2-Cl-4-$NO_2$ | 3-$NHCOCH_3$ | —$C_2H_5$ | —$CH_2CH_2$— | —$CH_2OCH_2$— | Red. |
| 32 | 2-Cl-4-$NO_2$ | 3-$CH_3$-6-$OCH_3$ | —$C_2H_5$ | —$CH_2CH_2$— | —$CH_2OCH_2$— | Red. |
| 33 | 2-Cl-4-$NO_2$ | 2-$CH_3$ | Hydrogen | —$CH_2CH_2$— | —$CH_2OCH_2$— | Orange. |
| 34 | 2-Cl-4-$NO_2$ | 2-Cl | do | —$CH_2CH_2$— | —$CH_2$—S— | Do. |
| 35 | 2-Cl-4-$NO_2$ | 3-$CH_3$ | —$C_4H_9$-n | —$CH_2CH_2$— | —$CH_2$—S— | Red. |
| 36 | 2-Cl-4-$NO_2$ | 3-$OCH_3$ | —$C_6H_5$ | —$CH_2CH_2$— | —$CH_2$—S— | Red. |
| 37 | 2-Cl-4-$NO_2$ | 3-$OCH_3$ | Cyclohexyl | —$CH_2CH_2$— | —$CH_2$—S— | Red. |
| 38 | 2-Cl-4-$NO_2$ | 3-$OCH_3$ | do | —$CH_2CH_2$— | —NH—C($CH_3$)$_2$—$CH_3$ | Red. |
| 39 | 2,4-bis-$SO_2CH_3$ | 3-$CH_3$ | —$C_2H_5$ | —$CH_2CH_2$— | —$NHCH_2CH_2$— | Orange. |
| 40 | 2,4-bis-$SO_2CH_3$ | 3-$CH_3$ | —$C_2H_4OCH_3$ | —$CH_2CH_2$— | —$NHCH_2CH_2$— | Do. |
| 41 | 2,4-bis-$SO_2CH_3$ | 3-$CH_3$ | —$C_2H_4OC(=O)CH_3$ | —$CH_2CH_2$— | —$NHCH_2CH_2$— | Do. |
| 42 | 2,4-bis-$SO_2CH_3$ | 3-$CH_3$ | —$C_2H_4SO_2CH_3$ | —$CH_2CH_2$— | —$NHCH_2$— | Do. |
| 43 | 2,4-bis-$SO_2CH_3$ | 3-$CH_3$ | —$CH_2$—CH($CH_3$)—$CH_3$ | —$CH_2CH_2$— | —NH—NH— | Do. |
| 44 | 2,4-bis-$SO_2CH_3$ | 3-$CH_3$ | —$CH_2CHOH$—$CH_2Cl$ | —$CH_2CH_2$— | —$CH_2$—O—$CH_2$— | Do. |
| 45 | 2,4-bis-$SO_2CH_3$ | 3-$CH_3$ | —$C_2H_5$ | —$CH_2CH(OH)CH_2$— | —$CH_2OCH_2$— | Do. |
| 46 | 2,4-bis-$SO_2CH_3$ | 3-$CH_3$ | —$C_2H_5$ | —$CH_2CH(OH)CH_2$— | —N($CH_3$)—$CH_2$— | Do. |
| 47 | 2,4-bis-$SO_2CH_3$ | 3-Cl | —$C_2H_5$ | —$CH_2CH(OH)CH_2$— | —NHCH=CH— | Do. |
| 48 | 2,4-bis-$SO_2CH_3$ | 3-Cl | —$C_2H_4$N(CO)$_2R_2$ (dicarboximido) | —$CH_2CH_2$— | —$NHCH_2CH_2$— | Do. |
| 49 | 2,4-bis-$SO_2CH_3$ | 3-$CH_3$ | —$C_2H_4$N(CO)$_2R_2$ (dicarboximido) | —$CH_2CH_2$— | —$CH_2OCH_2$— | Do. |
| 50 | 2,4-bis-$SO_2CH_3$ | 3-$CH_3$ | —$C_2H_4$N(CO)$_2R_2$ (dicarboximido) | —$CH_2CH_2$— | —$CH_2$—S— | Do. |
| 5 | 2,4-bis-$SO_2CH_3$ | 3-$CH_3$ | —$C_2H_4$N(CO)$_2R_2$ (dicarboximido) | —$CH_2CH_2CH_2$— | —$CH_2$—S— | Do. |

| Example No. | Aniline Diazotized | Dicarboximidoalkylaniline coupler ||||Color Polyester Dyeing |
|---|---|---|---|---|---|---|
| | | Substituents on Radical R₁ | R₂ | R₃ | Y | |
| 52 | 2,4-bis-SO₂CH₃ | 3-CH₃ | $-C_2H_4N\begin{smallmatrix}C=O\\ \\C=O\end{smallmatrix}R_2$ | —CH₂CH₂— | —NHCH₂— | Do. |
| 53 | 2-SO₂CH₃-4-NO₂ | 3-CH₃ | —C₂H₅ | —CH₂CH₂— | —NHCH₂— | Red. |
| 54 | 2-SO₂CH₃-4-NO₂ | 3-CH₃ | —C₂H₄OH | —CH₂CH₂— | —CH₂OCH₂— | Red. |
| 55 | 2-SO₂CH₃-4-NO₂ | 3-CH₃ | —C₂H₄OCONHC₆H₅ | —CH₂CH₂— | —CH₂S— | Red. |
| 56 | 4-Cl | 3-CH₃ | —C₂H₅ | —CH₂CH₂— | —NHCH₂CH₂— | Yellow. |
| 57 | 4-Cl | None | —C₂H₅ | —CH₂CH₂— | NHCH=CH— | Do. |
| 58 | 4-Cl | 3-CH₃ | —C₂H₅ | —CH₂CH₂— | —CH₂OCH₂— | Do. |
| 59 | 4-Cl | 3-CH₃ | —C₂H₅ | —CH₂CH(OH)CH₂— | —NHCH₂— | Do. |
| 60 | 4-CN | 3-CH₃ | —C₂H₅ | —CH₂CH(OH)CH₂— | —NHCH₂— | Do. |
| 61 | 4-CN | 3-CH₃ | —C₂H₅ | —CH₂CH₂— | —N(CH₃)—CH₂— | Do. |
| 62 | 4-CN | 3-CH₃ | —C₂H₅ | —CH₂CH₂— | —NHC(CH₃)₂—CH₃ | Do. |
| 63 | 4-CH₃ | 3-CH₃ | —C₂H₅ | —CH₂CH₂— | —NHC(CH₃)₂—CH₃ | Do. |
| 64 | 4-SO₂CH₃ | 3-CH₃ | —C₂H₄COOC₂H₅ | —CH₂CH₂— | —NHCH₂CH₂— | Orange. |
| 65 | 4-SO₂CH₃ | 3-CH₃ | —C₂H₅ | —CH₂CH₂— | —CH₂OCH₂— | Do. |
| 66 | 4-SO₂CH₃ | 3-CH₃ | —C₂H₅ | —CH₂CH₂— | —CH₂—S— | Do. |
| 67 | 4-NO₂ | None | —C₂H₅ | —CH₂CH₂— | —CH₂—S— | Do. |
| 68 | 4-NO₂ | 3-CH₃ | —C₂H₅ | —CH₂CH₂— | —NHCH₂— | Do. |
| 69 | 4-NO₂ | 3-CH₃ | —C₂H₅ | —CH₂CH₂— | —NH—NH— | Do. |
| 70 | 4-NO₂ | 3-CH₃ | —C₂H₅ | —CH₂CH₂— | CH₃CON—NCOCH₃ | Do. |
| 71 | 4-CHO | 3-CH₃ | —C₂H₅ | —CH₂CH₂— | —CH₂NH— | Do. |
| 72 | 4-COCH₃ | 3-CH₃ | —C₂H₅ | —CH₂CH₂— | —CH₂NH— | Do. |
| 73 | 4-COCH₃ | 3-CH₃ | —C₂H₅ | —CH₂CH₂— | —CH₂—O—CH₂— | Do. |
| 74 | 4-COCH₃ | 3-CH₃ | —C₂H₅ | —CH₂CH₂— | —CH₂—S— | Do. |
| 75 | 4-CF₃ | 3-CH₃ | —C₂H₅ | —CH₂CH₂— | —CH₂—S— | Do. |
| 76 | 4-CF₃ | 3-CH₃ | —C₂H₅ | —CH₂CH₂— | —CH₂CH₂NH— | Do. |
| 77 | 4-SO₂NH₂ | 3-CH₃ | —C₂H₅ | —CH₂CH₂— | —CH₂CH₂NH— | Do. |
| 78 | 4-SO₂N(CH₃)₂ | 3-CH₃ | —C₂H₅ | —CH₂CH₂— | —CH₂CH₂NH— | Do. |
| 79 | 4-NHCOCH₃ | 3-CH₃ | —C₂H₅ | —CH₂CH₂— | —CH₂CH₂NH— | Do. |
| 80 | 2-Cl-4,6-di-NO₂ | 3-CH₃ | —C₂H₅ | —CH₂CH₂— | —CH₂CH₂NH— | Violet. |
| 81 | 2-Cl-4,6-di-NO₂ | 2-OCH₃-5-NHCOCH₃ | —C₂H₅ | —CH₂CH₂— | —NHCH₂— | Blue. |
| 82 | 2-Cl-4,6-di-NO₂ | 2-OCH₃-5-NHCOCH₃ | $-CH_2CH_2N\begin{smallmatrix}C=O\\ \\C=O\end{smallmatrix}R_2$ | —CH₂CH₂— | —NHCH₂— | Do. |
| 83 | 2-Cl-4,6-di-NO₂ | 2-OCH₃-5-NHCOCH₃ | $-CH_2CH_2N\begin{smallmatrix}C=O\\ \\C=O\end{smallmatrix}R_2$ | —CH₂CH₂— | —CH₂—S— | Do. |

| Example No. | Aniline Diazotized | Dicarboximidoalkylaniline coupler | | | | Color Polyester Dyeing |
|---|---|---|---|---|---|---|
| | | Substituents on Radical R¹ | R² | R³ | Y | |
| 84 | 2-CN-4,6-di-NO₂ | 2-OCH₃-5-NHCOCH₃ | —CH₂CH₂N⟨(C=O)₂R₂⟩ | —CH₂CH₂— | —CH₂—S— | Blue. |
| 85 | 2-CN-4,6-di-NO₂ | 2-OCH₃-5-NHCOCH₃ | —CH₂CH₂N⟨(C=O)₂R₂⟩ | —CH₂CH₂— | —CH₂NH— | Do. |
| 86 | 2-CN-4,6-di-NO₂ | 2,5-di-OCH₃ | —CH₂CH₂N⟨(C=O)₂R₂⟩ | —CH₂CH₂— | —CH₂NH— | Do. |
| 87 | 2-CN-4,6-di-NO₂ | 3-CH₃ | —C₂H₅ | —CH₂CH₂— | —NHCH₂NH— | Do. |
| 88 | 2-CN-4,6-di-NO₂ | 3-CH₃ | —C₂H₅ | —CH₂CH₂— | —NHCH(OH)— | Do. |
| 89 | 2-CN-4,6-di-NO₂ | 3-CH₃ | —C₂H₅ | —CH₂CH₂— | —NH—CH₂CH(OH)— | Do. |
| 90 | 2-CN-4,6-di-NO₂ | 3-CH₃ | —C₂H₅ | —CH₂CH₂— | —NHCH(OH)—C(Cl)₂— | Do. |
| 91 | 2-CN-4,6-di-NO₂ | 3-CH₃ | —C₂H₅ | —CH₂CH₂— | —HN—(C₆H₄)—NH— | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 gram of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dyebath is then brought to the boil and held at the boil for one hour. Following this, the fabric is rinsed in warm water, then scoured in an aqueous 0.2% soap, 0.2% soda ash solution. After scouring, the fabric is rinsed with water and dried. Accordingly, since the azo compounds of the invention. After scouring, the fabric is rinsed with water and dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material.

By cellulose aliphatic carboxylic acid esters having 2 to 4 carbon atoms in the acid groups thereof, we mean to include, for example, both partially hydrolyzed and unhydrolyzed cellulose acetate, cellulose propionate and cellulose acetate-butyrate.

Polymeric linear polyester materials of the terephthalate type are illustrative of the linear aromatic polyester textile materials that can be dyed with the new azo compounds of our invention. The terephthalate fibers sold under the trademarks "Kodel," "Dacron" and "Terylene," for example, in the form of filaments, yarn and fabric, for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363, for example, can be dyed. The linear aromatic polyester materials specifically named have a melting point of at least 200° C.

Nylon, in fiber, yarn and fabric form is representative of polyamides which can be dyed with the azo compounds.

The invention has been described in considerable detail with particular reference to certain preferred embodiments thereof, but it will be understood that variations and modifications can be effected within the spirit and scope of the invention as described hereinabove, and as defined in the appended claims.

What we claim is:

1. An azo compound of the general formula

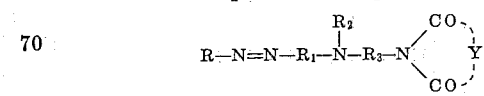

wherein
  R = a benzene radical,
  R₁ = a phenylene radical, $R_2$=a member of the class consisting of hydrogen atom, a lower alkyl radical, and a benzene radical,
$R_3$=a lower alkylene group, and
Y=—NHNH— or a chain of 2 or 3 atoms consisting of carbon and at least one oxygen, sulfur, or nitrogen atom.

2. An azo compound according to claim 1 wherein
$R_2$=a lower alkyl radical; and
Y=the atoms completing a uracil radical.

3. An azo compound according to claim 1 wherein
$R_2$=a lower alkyl radical; and
Y=the atoms completing a hydantoin radical.

4. An azo compound according to claim 1 wherein
$R_2$=a lower alkyl radical; and
Y=the atoms completing a piperazinedione radical.

5. An azo compound according to claim 1 wherein
$R_2$=a lower alkyl radical; and
Y=the atoms completing a morpholinedione radical.

6. An azo compound according to claim 1 wherein
$R_2$=a lower alkyl radical; and
Y=the atoms completing a thiazolinedione radical.

7. The compound

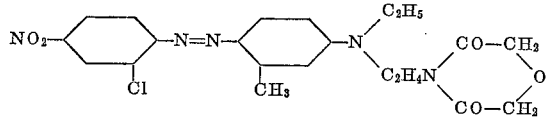

8. The compound

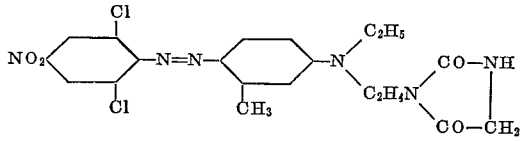

9. The compound

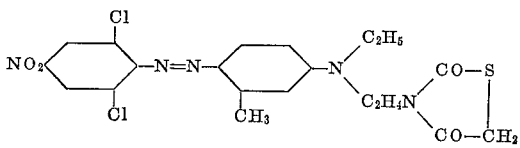

10. The compound

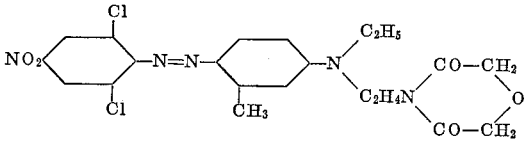

11. The compound

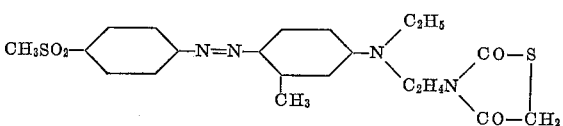

No references cited.

CHARLES B. PARKER, *Primary Examiner.*

D. M. PAPUGA, *Assistant Examiner.*